(12) United States Patent
Feenstra et al.

(10) Patent No.: US 8,350,783 B2
(45) Date of Patent: Jan. 8, 2013

(54) ELECTROWETTING ELEMENT, DISPLAY DEVICE AND CONTROL SYSTEM

(75) Inventors: Bokke Johannes Feenstra, Nuenen (NL); Anthony John Slack, Lorgues (FR)

(73) Assignee: Samsung LCD Netherlands R&D Center B.V., Eindhoven (NL)

( * ) Notice: Subject to any disclaimer, the term of this patent is extended or adjusted under 35 U.S.C. 154(b) by 350 days.

(21) Appl. No.: 12/622,749

(22) Filed: Nov. 20, 2009

(65) Prior Publication Data
US 2010/0128015 A1    May 27, 2010

Related U.S. Application Data

(63) Continuation of application No. PCT/EP2008/056210, filed on May 20, 2008.

(30) Foreign Application Priority Data

May 24, 2007 (GB) ................................ 0709987.2

(51) Int. Cl.
G09G 3/28 (2006.01)
(52) U.S. Cl. ............... 345/60; 345/41; 345/84; 345/211; 345/212; 359/290; 359/665; 359/666
(58) Field of Classification Search .................. None
See application file for complete search history.

(56) References Cited

U.S. PATENT DOCUMENTS

| | | | | |
|---|---|---|---|---|
| 4,294,518 A | * | 10/1981 | O'Connor et al. | 359/274 |
| 5,452,113 A | | 9/1995 | Ikeno | |
| 5,956,005 A | * | 9/1999 | Sheridon | 345/84 |
| 6,144,359 A | | 11/2000 | Grave | |
| 6,304,364 B1 | * | 10/2001 | Qin et al. | 359/291 |
| 6,394,608 B1 | * | 5/2002 | Shiraishi et al. | 353/57 |
| 6,577,433 B1 | * | 6/2003 | Lin et al. | 359/296 |
| 6,587,083 B1 | * | 7/2003 | Basturk | 345/4 |
| 6,924,792 B1 | * | 8/2005 | Jessop | 345/179 |
| 7,310,080 B2 | * | 12/2007 | Jessop | 345/89 |
| 7,463,398 B2 | * | 12/2008 | Feenstra et al. | 359/253 |
| 7,508,566 B2 | * | 3/2009 | Feenstra et al. | 359/228 |
| 7,697,187 B2 | * | 4/2010 | Kato et al. | 359/253 |

(Continued)

FOREIGN PATENT DOCUMENTS

GB       2348039 A       9/2000

(Continued)

OTHER PUBLICATIONS

Feenstra et al., "Electrowetting-Based Displays: Bringing Microfluidics Alive On-Screen," MEMS 2006, Istanbul, Turkey, Jan. 22-26, 2006, pp. 48-53.

(Continued)

*Primary Examiner* — Dismery Mercedes
(74) *Attorney, Agent, or Firm* — BainwoodHuang (57) ABSTRACT

The present invention relates to an electrowetting element for a display device, a display device and a control system for controlling at least one electrowetting element. The electrowetting element comprises: a radiation valve comprising a first fluid and a second fluid immiscible with the first fluid, wherein the first and second fluids are configurable to change a characteristic of radiation passing through at least one of the first and second fluids; and an electrically switchable part switchable between a reflective mode for reflecting radiation incident on the switchable part and towards the radiation valve, and a transmissive mode for transmitting radiation incident on the switchable part through the switchable part and towards the radiation valve.

24 Claims, 5 Drawing Sheets

U.S. PATENT DOCUMENTS

| | | | |
|---|---|---|---|
| 7,872,790 B2 * | 1/2011 | Steckl et al. | 359/253 |
| 7,903,061 B2 * | 3/2011 | Zhang et al. | 345/84 |
| 8,014,054 B2 * | 9/2011 | Lo et al. | 359/253 |
| 8,199,409 B2 * | 6/2012 | Hayes et al. | 359/665 |
| 2003/0035199 A1 * | 2/2003 | Liang et al. | 359/296 |
| 2003/0231268 A1 | 12/2003 | Chen, Jr. et al. | |
| 2005/0248697 A1 * | 11/2005 | Ukawa | 349/98 |
| 2006/0109435 A1 * | 5/2006 | Bleeker | 355/18 |
| 2007/0019006 A1 * | 1/2007 | Marcu et al. | 345/690 |
| 2007/0075941 A1 * | 4/2007 | Zhou et al. | 345/84 |
| 2007/0086078 A1 * | 4/2007 | Hagood et al. | 359/298 |
| 2007/0159678 A1 * | 7/2007 | Verhaegh et al. | 359/265 |

FOREIGN PATENT DOCUMENTS

| | | |
|---|---|---|
| JP | 5080349 | 4/1993 |
| JP | 10123559 | 5/1998 |
| JP | 10197844 | 7/1998 |
| JP | 10339859 | 12/1998 |
| WO | 03071346 A1 | 8/2003 |
| WO | 2004013687 A1 | 2/2004 |
| WO | 2005029170 A1 | 3/2005 |
| WO | 2005069069 A1 | 7/2005 |
| WO | 2005098797 A2 | 10/2005 |
| WO | 2006011101 A1 | 2/2006 |
| WO | 2006017129 A2 | 2/2006 |
| WO | WO 2006017129 A2 * | 2/2006 |

OTHER PUBLICATIONS

International Search Report for PCT/EP2008/056210, mailed on Nov. 14, 2008.

UK Search Report for GB0709987.2, date of search Aug. 9, 2007.

* cited by examiner

ELECTROWETTING ELEMENT, DISPLAY DEVICE AND CONTROL SYSTEM

CROSS REFERENCE TO RELATED APPLICATIONS

This application is a continuation of International Patent Application No. PCT/EP2008/056210 filed on May 20, 2008 and entitled "ELECTROWETTING ELEMENT, DISPLAY DEVICE AND CONTROL SYSTEM", the contents and teachings of which are hereby incorporated by reference in their entirety.

FIELD OF THE INVENTION

The present invention relates to an electrowetting element which is transflective, namely it can exhibit both optically transmissive and reflective properties, particularly for a display device.

BACKGROUND

In the field of liquid crystal displays (LCDs), transflective displays are known. For example, international patent application no. WO 2004/013687 describes such a display. An optical element is switchable between a transmissive mode and a reflective mode by application of a voltage to a polymer dispersed type liquid crystal display element. This switching controls whether external light, or light emitted by a backlight, passes through a liquid crystal panel.

It is an object of the present invention to provide an alternative transflective optical element.

SUMMARY

In accordance with a first aspect of the present invention, there is provided an electrowetting element for a display device, wherein the electrowetting element comprises:

a) a radiation valve comprising a first fluid and a second fluid immiscible with the first fluid, wherein the first and second fluids are configurable to change a characteristic of radiation passing through at least one of said first and second fluids; and b) an electrically switchable part switchable between a reflective mode for reflecting radiation incident on the switchable part and towards said radiation valve, and a transmissive mode for transmitting radiation incident on the switchable part through said switchable part and towards said radiation valve.

Switching the switchable part causes the electrowetting element to change between a transmissive mode of operation and a reflective mode of operation. Preferably, the switchable part and the radiation valve are independently controllable.

Since the action of switching the switchable part, and the action of changing a configuration of the first and second fluids are each performed electrically, it is important that one of these actions does not interfere with the other action. The electrowetting element is preferably arranged such that these two actions can be performed independently of each other.

Changing the configuration of the first and second fluids, and changing their configuration, allows image characteristics provided by the electrowetting element to be easily and quickly controlled. Such image characteristics may, for example, be a colour provided in radiation passing through the electrowetting element.

In the prior art, for example in international patent application WO 2004/013687, a liquid crystal display (LCD) panel provides an image. Such a LCD panel requires alignment layers adjacent a liquid crystal material to determine a correct orientation of molecules of the liquid crystal. Moreover, polarisation layers are also required, due to the birefringent properties of the liquid crystal material, to ensure that light passing through the LCD panel has a correct polarisation. Thus, the LCD panel results in a relatively bulky display device. The electrowetting element of the present invention does not require such alignment layers or polarisation layers. Thus, a transflective electrowetting element of the present invention can be more compactly constructed in comparison with the prior art.

The polarisers of the display of international patent application no. WO 2004/013687 reduce the amount of light transmitted through the display, and thus reduce the brightness of displayed images. The brightness of such images is further reduced when the LCD display is operated in a diffuse reflective mode, since the diffuse reflection often changes the light polarisation so that the polarisers block light with an undesired polarisation from passing further through the electrowetting element. Thus, since the electrowetting element of the present invention does not require such polarisers, the present invention can provide image characteristics of a greater maximum brightness than the prior art.

An image provided by the prior art display is of a lower quality when the polymer dispersed liquid crystal (PDLC) is in the reflective mode, compared with when the PDLC is in the transmissive mode. This is due to parallax caused by a separation between the PDLC layer and the liquid crystal panel. The lack of polarisers and alignment layers in the electrowetting element of the present invention allows a transflective electrowetting element to be constructed where such a separation is significantly lower than that of the prior art. Thus, in accordance with the present invention, the parallax effect can be reduced. Thus, image characteristics provided by the electrowetting element of the present invention, when in both the reflective and transmissive modes, are of a higher quality.

The electrowetting element of the present invention is simple and cost-effective to manufacture. In the prior art, alignment layers of LCD displays need to be correctly oriented, requiring precision manufacturing techniques. The lack of alignment layers in the electrowetting element of the present invention obviates this manufacturing requirement.

LCD displays, such as those described in international patent application no. WO 2004/013687, have a restricted viewing angle of a provided image. This is due to the birefringent properties of the liquid crystal material. Since the electrowetting element of the present invention lacks birefringent material, an image provided using the electrowetting element of the present invention has a broader viewing angle. A transflective display according to the present invention provides a less restricted viewing angle than the prior art display.

Preferably, the electrowetting element of the present invention includes a support plate arranged between said switchable part and said radiation valve to support mechanically the switchable part and the radiation valve.

Such a support plate may be a single support plate, common to both the switchable part and the radiation valve, which mechanically supports both the switchable part and radiation valve, and which allows the electrowetting element of the present invention to be manufactured simply, efficiently and according to a more compact design than in the prior art. Moreover, using such a common substrate, instead of a plurality of separate substrates, reduces the separation between the switchable part and radiation valve to reduce any parallax exhibited by the element. Such an element is usable in display devices for providing images of a high quality, with reduced parallax, when operating in both transmissive and reflective modes. In comparison, for example, the display described in international patent application no. WO 2004/013687 comprises two glass substrates and a polariser which separate the LCD panel and the transflective element, requiring a more complex manufacturing process and resulting in a more bulky construction.

Embodiments are envisaged, for example the embodiment described later using FIG. 2, where a support plate substrate between the switchable part and the radiation valve does not need to be processed on either side during manufacture. This allows for the substrate to be made of a variety of different materials, and to have a reduced thickness; a greater thickness would be required if the substrate was to be processed. Consequently, with a reduced thickness, a separation between the radiation valve and the switchable part may be reduced to reduce parallax. A display incorporating an element according to the invention may therefore display images of a high quality without, or with reduced, parallax.

It is envisaged in further embodiments of the electrowetting element according to the invention that two support plates may be provided instead of the common support plate, as explained later.

In preferred embodiments of the present invention, the electrowetting element is arranged for a control system to apply a first voltage across at least one of said first and second fluids and to apply a second voltage to said switchable part.

The control system is used to control operation of the electrowetting element, in order to provide advantageous functioning of at least one electrowetting element.

The electrowetting element may include electrodes for connection to the control system and for applying the first and second voltages to the radiation valve and the switchable part, respectively. Manufacturing an electrode as a layer, for example, onto a support plate for the switchable part needs to be performed carefully. Otherwise, damage may be caused to the switchable part. Embodiments of the present invention are envisaged where an electrode for operating the radiation valve does not need to be processed on a support plate in common with the switchable part; the functionality of the radiation valve may be obtained by providing electrodes in alternative positions within the electrowetting element which are not located between the switchable part and the radiation valve. Such embodiments provide significant advantages by providing that manufacture of the electrowetting element is simple, and devoid of such risks of damage to parts of the electrowetting element. Furthermore, the optical efficiency of the element, for both transmissive and reflective modes, is improved by not having an electrode located between the switchable part and the radiation valve.

Application of a first voltage which is different from the second voltage allows the radiation valve and the switchable part to be electrically controlled separately. Below, the first voltage is also referred to as an electrowetting voltage and the second voltage is referred to as a polymer dispersed liquid crystal (PDLC) voltage.

In preferred embodiments, the switchable part includes a reflective fluid and a non-reflective fluid immiscible with the reflective fluid, the reflective and non-reflective fluids being configurable to switch said reflective and non-reflective fluids between a transmissive mode and a reflective mode.

In such embodiments, the switchable part can be simply and efficiently switched between the reflective and transmissive modes by moving the reflective fluid across a cross sectional area of the electrowetting element. The fluid nature of the reflector of the switchable part facilitates easy and compact integration of the switchable part with the radiation valve as the switchable part and radiation valve are manufactured during the same process and using the same equipment. As described previously, an element according to the invention may be manufactured with a common substrate, or two substrates, separating a part of the switchable part and a part of the radiation valve. With a common substrate, the separation between the radiation valve and the switchable part is reduced; thus reducing any parallax effect caused by the distance between the radiation valve and the switchable part, and allowing a display including the element to provide images of a high quality in both the reflective and transmissive modes. A reduction of such a separation may be achieved by reducing volumes of the first and second fluids.

Preferably, said switchable part is integrated with said radiation valve, said second fluid being said non-reflective fluid, wherein only said second fluid separates said first fluid and said reflective fluid.

Such embodiments are particularly advantageous; no substrate is required between the radiation valve and the switchable part. Typically, such a substrate may be approximately 200-500 µm in thickness, depending on whether the substrate has been processed or not. Without such a substrate, the separation between the reflective fluid and the first fluid, which may function as a colour filter, may be significantly reduced in a direction parallel an optical path of the element. Thus, any parallax effect caused by the electrowetting element is further reduced, allowing higher quality images to be provided using the electrowetting element, when in both the reflective and transmissive modes. Indeed, by selecting a relatively low volume of the first and second fluids, and of the reflective fluids, to provide suitable operation, a highly compact electrowetting element may be realised which exhibits reduced parallax.

In preferred embodiments, the switchable part includes a layer of polymer dispersed liquid crystal (PDLC) and is switchable between the transmissive and reflective modes by application of a voltage across said PDLC layer.

The PDLC layer may be switched between the transmissive and reflective modes quickly and easily using a control system. Further, in embodiments of the invention, use of a PDLC layer, in combination with the radiation part valve switching of fluids with electrowetting, provides for simple manufacture and effective operation of the element.

Preferably, the radiation valve includes at least one further fluid which is immiscible with at least one of said first and second fluids or with a second further fluid, said at least one further fluid being configurable between different fluid configurations to change said characteristic of the radiation.

Displays are described below using the terminology "one layer", "two layer", "three layer" and "four layer". Each of these terms refers to a number of non-conductive fluids in each electrowetting element. For example, a "three layer" system would include three non-conductive fluids, for example liquids, which are configurable to be switched, independently, into and out of the path of radiation passing through the display. If each of these three non-conductive liquids is a different colour filter, differently switching these liquid layers into the radiation path would differently filter the radiation. For example, if the three layers were each one of a cyan, magenta and yellow colour filter, a full colour transflective display would advantageously be realised.

In embodiments of the present invention, the electrowetting element comprises a first colour filter arranged to filter radiation passing through at least part of the electrowetting element.

Such a colour filter allows a colour of radiation passing through the electrowetting element to be changed, so as to control characteristics of an image provided using the electrowetting element.

Further, preferably, the electrowetting element comprises a second colour filter, said first and second colour filter being arranged such that, with the switchable part being in the reflective mode, radiation passing through the electrowetting element passes at least twice through said first colour filter only, and, with the switchable part being in the transmissive mode, radiation passing through the electrowetting element passes at least once through each of said first and second colour filters.

To provide high quality images in both the reflective and transmissive modes, the colour saturation of images provided using the electrowetting element is preferably at least similar, preferably the same, for both the reflective and transmissive modes. In such embodiments including the first and second colour filters, the configuration of the colour filters provides this important advantage.

In preferred embodiments, one of said fluids is arranged to absorb substantially all radiation passing through at least part of said electrowetting element.

With such an absorbing fluid, the element is provided with a shutter for controlling a brightness of images displayed by a display device including the electrowetting elements. Grey scale colouring of radiation passing through the element may also be controlled.

Further preferably, the switchable part is switchable to provide an intermediate mode for reflecting radiation incident on the switchable part towards said radiation valve and for transmitting radiation incident on the switchable part through said switchable part and towards said radiation valve.

Switching from the transmissive or reflective mode to at least one intermediate mode allows the brightness of an image for a display device provided by the element to be tuned with more refinement. Thus, images having an optimum brightness can be viewed easily by a viewer, regardless of ambient light conditions.

In further preferred embodiments, the electrowetting element comprises a radiation emitter arranged to emit radiation for transmission through said switchable part.

In this way, the electrowetting element of the present invention is configured to provide illumination for an image provided using the electrowetting element when the switchable part is in the transmissive mode, and to provide illumination for such an image using ambient radiation when the switchable part is in the reflective mode.

In accordance with a further aspect of the present invention, there is provided a display device comprising a plurality of the electrowetting element according to the present invention, and a control system arranged to control electrically each of said plurality of electrowetting elements.

Such a display device is capable of displaying images which are generated using the plurality of electrowetting elements. Accordingly, each pixel of an image may be provided with a certain image characteristic by a different one of the electrowetting elements. The control system controls the image characteristics provided by each of the electrowetting elements, and controls whether the illumination of at least part of the image is provided using each of the electrowetting elements in only the transmissive mode, only the reflective mode, or using a combination of both modes.

Preferably, the control system is arranged to switch simultaneously the switchable part of each of said plurality of electrowetting elements between the reflective mode and the transmissive mode and/or to switch the fluids between different configurations.

Further preferably, the control system is arranged to switch the switchable part of one of the plurality of electrowetting elements between the reflective mode and the transmissive mode, and/or to configure the first and second fluids, separately from a different one of the plurality of electrowetting elements.

In preferred embodiments, the control system is arranged to apply a first voltage across at least one of said first and second fluids of the radiation valve of at least one electrowetting element and to apply a second voltage to said switchable part of at least one electrowetting element.

Preferably, the control system is arranged to apply said first and second voltages in accordance with a maximum voltage set to provide said switching of the switchable part independently of said configuring of the first and second fluids.

As explained earlier, it is important that the switchable part and the radiation valves can be controlled independently of each other to prevent interference. Controlling the voltage application, to ensure that the first and second voltages do not exceed a maximum voltage, allows control of the switchable part independently from the radiation valve. Otherwise, application of one of the first and second voltages to control one of the switchable part and the radiation valve would, undesirably, electrically influence the other of these parts. Further details in this respect are explained below.

Also preferably, the control system is arranged to apply said first and second voltages in accordance with a voltage timing pattern determined to provide said switching of the switchable part independently of said configuring of the first and second fluids.

The voltage timing pattern is determined, for example, to ensure that when the first voltage is applied, the second voltage is applied so as not to interfere with application of the first voltage. Further, for example, a timing of applying the first and second voltages, each with a certain magnitude, can be controlled to ensure that simultaneous application of the first and second voltages does not exceed the maximum voltage. Further details are explained below.

In further preferred embodiments, the switchable part is electrically isolated from said radiation valve, and said control system is arranged to apply said first and second voltages in accordance with an extent of said electrical isolation.

The extent of electrical isolation can be determined by specifying certain electrical isolation parameters, for example a thickness of an electrical isolation material or a dielectric constant of an electrically isolating material. Application of the first and second voltages according to the extent of isolation ensures that application of one of the first or second voltages to control one of the switchable part and radiation valve does not disadvantageously interfere with the other of the part or the valve.

Preferably, said display device includes an ambient radiation detector and the control system is arranged to switch the switchable part in accordance with an output signal of the ambient radiation detector.

The ambient radiation detector measures a level of ambient radiation in the environment surrounding the display device, and outputs a signal indicative of the level of ambient radiation to the control system. In accordance with this signal, the control system switches the switchable part to the transmissive mode, to the reflective mode, or to an intermediate transflective mode, so that a brightness of an image provided by the display device is optimised for a viewer in dependence on ambient radiation conditions.

According to a yet further aspect of the present invention, there is provided a control system arranged to control at least one electrowetting element in accordance with the present invention, wherein said control system is arranged to apply a first voltage across at least one of said first and second fluids of the radiation valve and to apply a second voltage to said switchable part.

By application of the first and second voltages, the control system is capable of controlling the electrowetting element of the present invention, to provide an image of a high quality and to change properties of the image both rapidly and simply.

Further features and advantages of the invention will become apparent from the following description of preferred embodiments of the invention, given by way of example only, which is made with reference to the accompanying drawings.

DETAILED DESCRIPTION

Figure 1:
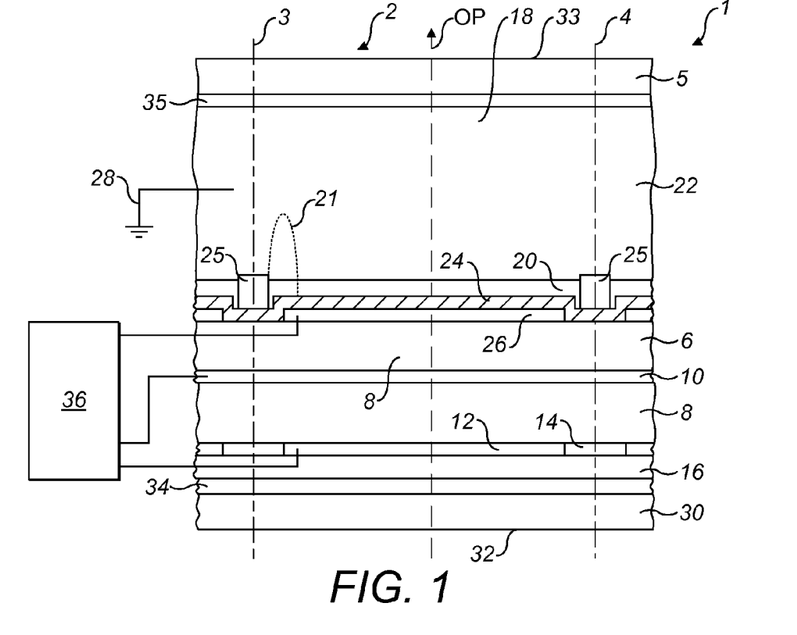
FIGS. 1 to 6 each show, schematically, a display device including an electrowetting element in accordance with different embodiments of the present invention.

FIG. 1 shows a diagrammatic cross-section of an embodiment of a one layer transflective display device 1 according to the invention. The display device includes a plurality of electrowetting elements 2, one of which is shown in FIG. 1. The lateral extent of the element is indicated in FIG. 1 by the two dashed lines 3, 4. The elements comprise a first support plate 5 and a second support plate 6. The support plates may be separate parts of each electrowetting element, but the support plates are preferably in common for the plurality of electrowetting elements. The support plates may be made for instance of glass or polymer and may be rigid or flexible, and are optically transparent. The second support plate 6 mechanically supports the radiation valve and the switchable part which will be described below.

The electrowetting element comprises a switchable part arranged in this embodiment adjacent and beneath the second support plate 6. The switchable part includes a polymer dispersed liquid crystal (PDLC) material arranged as a layer 8, a first PDLC electrode 10 and a second PDLC electrode 12. The PDLC layer 8 is sandwiched between the first and second PDLC electrodes 10, 12 and the first and second PDLC electrodes are formed of a transparent material, for example indium tin oxide.

The PDLC layer 8 is preferably common for the plurality of electrowetting elements. Similarly, the first PDLC electrode 10 is preferably common for the plurality of electrowetting elements. A separate second PDLC electrode 12 is provided for each of the plurality of electrowetting elements, each second PDLC electrode 12 being electrically insulated from each other with an electrical insulator 14.

The PDLC material provided in the present invention may be of the conventional type, namely comprising liquid crystal droplets dispersed in a solid polymer matrix. As is known in the art, the PDLC material generally provides a diffuse reflector in a mode when a zero PDLC voltage is applied across the PDLC material, whereas it becomes transparent, and therefore transmissive, when a nonzero PDLC voltage of appropriate magnitude is applied across the PDLC material. Similarly, the PDLC material of the present invention has a transmissive mode and a reflective mode, as explained below. Further details of the composition and manufacture of PDLC materials are enclosed herein by way of reference to "Liquid Crystal Displays" by Shin-Tson Wu and Deng-Ke Yang, published by John Wiley & Sons, Ltd in 2001. It is to be appreciated that, in accordance with further embodiments of the present invention, a polymer networked liquid crystal (PNLC) layer may be provided instead of the PDLC layer to obtain transmissive and reflective properties equivalent with those of the PDLC layer.

The first PDLC electrode 10 lies adjacent one face of the second support plate 6 and a third support plate 16 beneath the PDLC layer and for mechanically supporting the switchable part, lies adjacent and beneath the second PDLC electrode 12. Application of a nonzero PDLC voltage between the first and second PDLC electrodes and thus across the PDLC layer causes the liquid crystal droplets of the PDLC material to align with each other, in accordance with the direction of the electrical field created by the applied nonzero PDLC voltage. This provides a transmissive mode of the switchable part, allowing radiation to pass through the PDLC layer 8, for example in a direction parallel an optical path OP of the element 2. When a zero PDLC voltage is applied between the first and second PDLC electrodes, the liquid crystal droplets are not aligned with each other. This provides a reflective mode of the switchable part; the PDLC layer 8 acts as a diffuse reflector and reflects ambient radiation, having entered the element 2 through the viewing side 33, back towards and through the viewing side 33.

The electrowetting element further comprises a radiation valve for modifying a characteristic of radiation passing through at least part of the element 2. The radiation valve may filter radiation passing through it, preferably radiation in the visible spectrum, or entirely block radiation passing through it. The radiation valve comprises a first fluid and a second fluid immiscible with the first fluid which together fill a space 18 between the first and second support plates 5, 6. The first fluid and the second fluid are a first liquid 20 and a second liquid 22, respectively. The first liquid is electrically nonconductive and may for instance be an alkane like hexadecane or (silicone) oil. The second liquid is electrically conductive or polar, and may be a water or salt solution such as a solution of KCl in a mixture of water and ethyl alcohol. The second liquid is preferably transparent.

A hydrophobic layer 24 is arranged on the second support plate 6, facing the space 18. The layer 24 may be an uninterrupted layer extending over a plurality of electrowetting elements or it may cover a cross-sectional area of the element 2, taken in a plane perpendicular the direction of the optical path OP, which is defined by walls 25. The layer 24 may be for instance an amorphous fluoropolymer layer such as AF1600 or other low surface energy polymers such as Parylene. The hydrophobic character causes the second liquid to adhere preferentially to the support plate 6.

Each electrowetting element includes a first electrowetting electrode 26 arranged on the support plate 6. The first electrowetting electrode 26 is separated from the liquids by an electrical insulator, which may be the hydrophobic layer 24. In general, the first electrowetting electrode 26 has the same shape as the cross-sectional area of the electrowetting element. A second electrowetting electrode 28 is connected to the conductive second liquid 22. This second electrowetting electrode 28 can be common to a series of electrowetting elements that share the second liquid, uninterrupted by the walls 25. The first electrowetting electrodes 26 on the support plate 6 are connected to an electrical terminal on the support plate 6 by a matrix of printed wiring. Such electrodes 26 and wiring are preferably transparent and made of e.g. indium tin oxide. The matrix may include switching elements such as transistors; in this case the matrix is called an active matrix.

The lateral extent of the second liquid 22 is constrained to one electrowetting element by the walls 25 that follow the cross-section of the electrowetting element 2. Further details of the electrowetting element and its manufacture are disclosed amongst others in international patent application WO 2005/098797.

When a nonzero electrowetting voltage is applied between the first and second electrowetting electrodes 26 and 28, electrostatic forces will move the second liquid 20 towards the first electrowetting electrode 26, thereby repelling the first liquid 20 from the area of the first electrowetting electrode 26 to the walls 28 surrounding the area of the electrode 26, schematically indicated by a dashed line 21. When the electrowetting voltage is returned to zero, the first liquid flows back to cover the hydrophobic layer 24 to provide a different liquid configuration. Thus, the first and second liquids are differently configurable by applying different electrowetting voltages.

A radiation emitter, in this embodiment a backlight 30, may be arranged at a rear side 32 of the electrowetting element to provide backlighting for the electrowetting element. Thus, with the switchable part being in the transmissive mode, radiation emitted from the backlight 30 passes from the rear side 32, through the switchable part and the radiation valve, and through a viewing side 33 of the element 2, for example along the optical path OP. The backlight may be provided in common for a plurality of the electrowetting elements, for illuminating the plurality of electrowetting elements. In this embodiment, the backlight comprises a single white light source. The backlight may be of a conventional construction, such as disclosed for instance in international patent application WO 2006/011101.

In this embodiment, the first liquid 20 includes a dye so that the first liquid 20 acts as a colour filter which filters radiation passing through the first liquid. A first non-fluid colour filter 34 may also be provided, for example, between the third support plate 16 and the backlight 30. A second non-fluid colour filter 35 may also be provided, for example, between the first support plate 5 and the first liquid 18 in addition to, or instead of, the non-fluid colour filter 34. Thus, the radiation passing through at least part of the element 2 may be filtered by either of the non-fluid filters 34, 35, and also by the dyed first liquid 20 when configured to lie substantially across the path of the radiation emitted from the backlight 30. Alternatively, the element may not include either of the two non-fluid colour filters 34, 35.

In an advantageous embodiment, both non-fluid colour filters 34, 35 are provided and are arranged to filter substantially identically radiation passing through them, by each absorbing radiation of the same wavelength(s) and by absorbing substantially the same amount of radiation. Thus, with the switchable part switched in the transmissive mode, and the nonzero electrowetting voltage applied, radiation emitted by the backlight 30 may be filtered by each of the non-fluid colour filters 34, 35. With the switchable part being switched in the reflective mode, and the nonzero voltage electrowetting voltage applied, ambient radiation entering the element 2 through the viewing side 33 passes once through the second non-fluid colour filter 35 and then passes through this filter 35 a second time after being reflected by the PDLC layer 8 back towards the viewing side 33; the radiation does not, however, pass through the first non-fluid colour filter 34. This is advantageous because the colour of radiation exiting the element 2 through the viewing side 33 has the same level of saturation irrespective of whether the switchable part is in the transmissive or reflective mode. A similar advantageous arrangement of non-fluid filters may be provided in the element described later using FIG. 5, where the switchable part does not use a PDLC, but instead uses a reflective liquid.

Operation of the electrowetting element is controlled by a control system 36 of the display device electrically connected to the first electrowetting electrode 26, and to the first and second PDLC electrodes 10, 12. The control system 36 controls application of the electrowetting and PDLC voltages to control electrical switching of the first and second liquids 20, 22 between different liquid configurations and to control switching of the PDLC between the transmissive and reflective modes.

The control system 36 may apply the electrowetting and PDLC voltages in accordance with a maximum voltage set to provide that switching of the PDLC and of the liquids 20, 22 between different configurations may be performed independently. Otherwise, if one of the electrowetting and PDLC voltages exceeds the maximum voltage, this voltage may interfere with the one of the switched part and the radiation valve to which the voltage is not intended to be applied to. For example, the maximum voltage is set so the applied PDLC voltage is does not interfere with correct operation of the radiation valve. Such interference can cause undesirable switching of the switchable part or radiation valve which leads to poor quality images provided by the display device.

The control system 36 may also apply the electrowetting and PDLC voltages in accordance with a voltage timing pattern. This pattern is determined to avoid interference of switching of the configuration of the first and second liquids or the mode of the switchable part with the other of switching the configuration or switchable mode. For example, if simultaneous application of a certain electrowetting voltage and a certain PDLC voltage would exceed a set maximum voltage, causing interference with correct operation of the radiation valve and/or the switchable part, the timing pattern may be set so that application of one of the PDLC and electrowetting voltages is timed to not coincide with the other one of the PDLC and electrowetting voltages. With this timing, a simultaneous application of the electrowetting voltage and PDLC voltage would not exceed the maximum voltage.

The radiation valve may be electrically isolated from the switchable part. This isolation may be provided by the material of the second support plate 6. Alternatively, there may be provided a further layer of material having a certain extent of electrical isolation between the radiation valve and the switchable part. The extent of isolation is selected to prevent application of one of the PDLC and electrowetting voltages from interfering with correct operation of the switchable part or radiation valve corresponding with the other one of the PDLC and electrowetting voltages. For example, the isolation extent prevents the electrowetting voltage from interfering with correct operation of the switchable part by preventing creation of an undesired electric field in the switchable part.

Further embodiments are envisaged where the control system 36 applies the PDLC and electrowetting voltages in accordance with a combination of any of such a set maximum voltage, a voltage timing pattern and an extent of isolation to ensure correct functioning of the element 2.

It is envisaged that the switchable part may also be switched to an intermediate mode which exhibits both transmissive and reflective characteristics. Such an intermediate mode is obtained by applying an appropriate PDLC voltage, controlled by the control system 36, to obtain only partially aligned PDLC liquid crystal droplets. The ratio of transmissive characteristics and reflective characteristics provided by the intermediate mode allows a optimum radiation brightness to be provided, under control of the control system, on the viewing side 33 in accordance with the amount of ambient radiation. Where necessary, in low ambient light conditions, radiation is emitted from the backlight 30 to improve the brightness of the image.

It is possible for the first and second liquids 20, 22 to be switched to further, different, configurations from those described above by applying appropriate electrowetting voltages. For example, a further configuration of the first and second liquids 20, 22 may be obtained where the hydrophobic layer 24 is partially covered by the first liquid 20 and partially by the second liquid 22. Where the first liquid 20 is a colour filter the radiation passing through the element 2 is filtered in accordance with the extent of the first liquid lying in the path of the radiation, and is less filtered than when the first liquid substantially covers all of the hydrophobic layer 24.

Where the first liquid 20 is a colour filter, it is arranged to absorb part of the optical spectrum of the radiation passing through the first liquid 20. Alternatively, the first liquid may be arranged to absorb substantially all of the optical spectrum of the radiation, thus providing a black first liquid 20. In such embodiments, the first liquid 20 acts as an optical shutter. Such embodiments may allow for a grey colour of the radiation to be controlled; international patent application WO 2003/071346 discloses measures that allow the second liquid to cover the area of the electrode 14 only partially, to realise such grey-scale colours.

An alternative one layer embodiment of the invention will be described with reference to FIG. 2. Features of this embodiment are similar to those described previously. Such features will be referred to using the same reference numerals, incremented by 100; corresponding descriptions should be taken to apply here also.

In this embodiment, in contrast with the display described using FIG. 1, the radiation valve is inverted with respect to the switchable part. Thus, the face of the second support plate 106 facing away from the liquids 120, 122 is the viewing side 133, and the first support plate 105 lies in contact with the first PDLC electrode 110 and mechanically supports the switchable part and the radiation valve. A further support plate (not indicated) may be arranged between the first support plate 105 and the first PDLC electrode 110, to provide additional mechanical support. This embodiment may also be easier to manufacture, by simply stacking a lower support plate corresponding with a pre-manufactured radiation valve onto an upper support plate corresponding with a pre-manufactured radiation valve onto a pre-manufactured switchable part.

Figure 2:
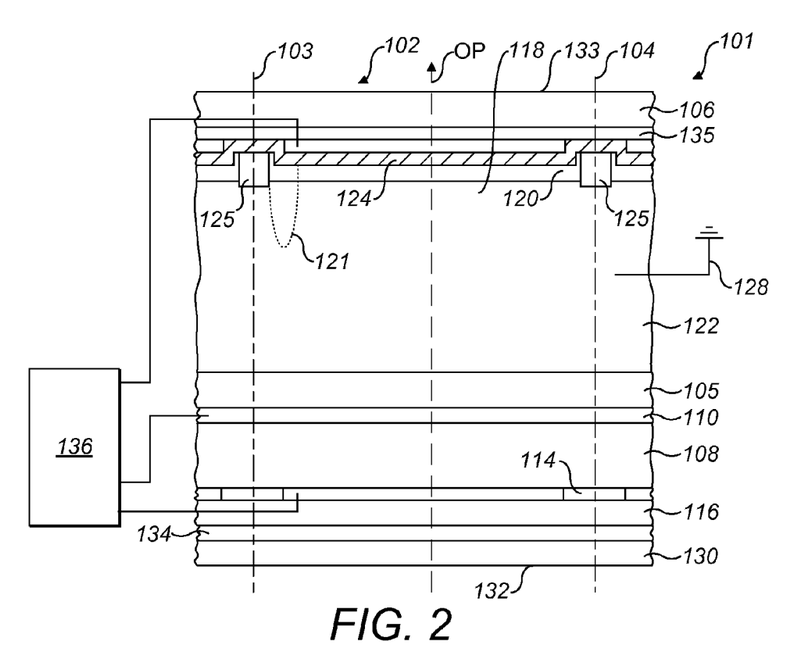

In the embodiment shown in FIG. 2, no electrode or other functional layers need to be deposited on an upper surface of the first support plate 105 which faces the liquids. In particular, in an active matrix type display, no transistors, wiring or other electronics need to be manufactured upon this upper surface; thus simplifying processing of the first support plate 105 during manufacture. Moreover, if this support plate is not processed, this provides more freedom for the choice of material which this support plate may be formed of. Such materials include, for example, glasses and polymer materials.

There is no electrowetting electrode between the first PDLC electrode 110 and the liquids 120, 122. Thus, because electrodes arranged for applying a voltage across the first and second liquids are free from between the switchable part and the first and second liquids, a build height of the element 102, taken in a direction parallel the optical path OP, may be reduced. Consequently, the distance between the first liquid 120 and the PDLC layer 108, taken in a direction parallel the optical path OP, is reduced, which advantageously reduces parallax in images provided by the display device 101.

Figure 3:
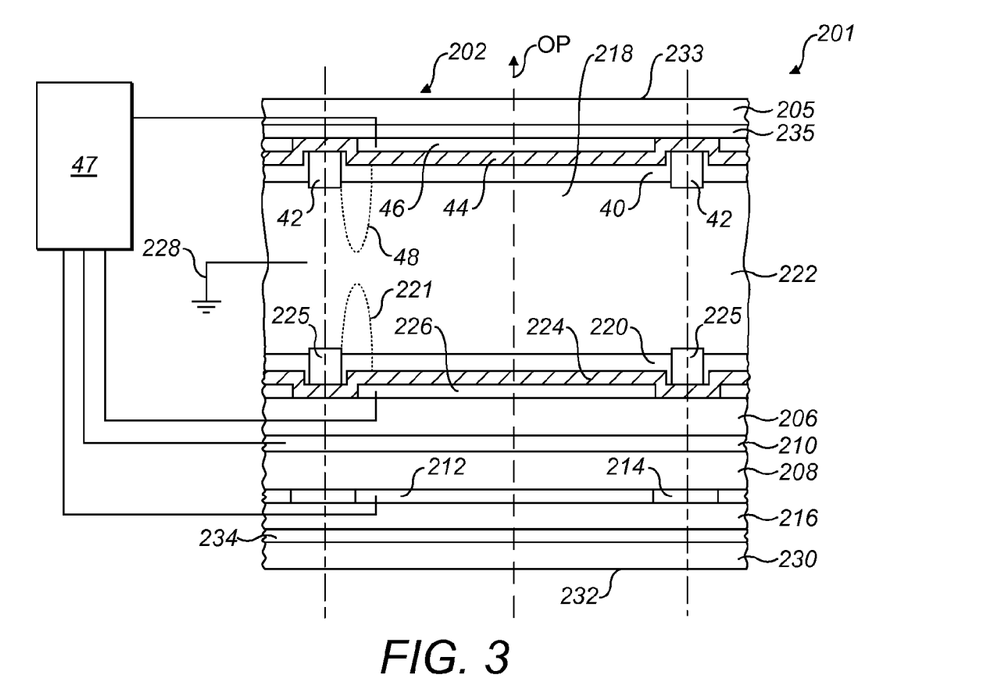

Referring to FIG. 3, a two layer embodiment of the invention will now be described. Features of this embodiment are similar to those described previously. Such features will be referred to using the same reference numerals, incremented by 200; corresponding descriptions should be taken to apply here also.

Each element of this embodiment may be considered to be a combination of the element described using FIG. 1 and the element of FIG. 2. The element 202 further includes a third liquid 40 which is a non-conductive liquid, further walls 42, a further hydrophobic layer 44 and a third electrowetting electrode 46, which are arranged between the first support plate 205 and the first liquid 222. These features are similar to the first liquid 120, walls 125, hydrophobic layer 124 and first electrowetting electrode 126, respectively, described previously and are arranged in a similar manner with respect to the switchable part to the corresponding features described using FIG. 2.

The control system 47 is similar to that described using FIG. 1 and is also electrically connected to the third electrowetting electrode 46. The third liquid 40 is independently moveable across the further hydrophobic layer 44 by application of a second electrowetting voltage across the third liquid 40, in a similar manner as moving the first liquid 220. With a nonzero second electrowetting voltage applied, the repelled third liquid 40 has a configuration schematically indicated by dashed line 48. With a nonzero electrowetting voltage applied across both the first and third liquids 220, 40, the repelled first and third liquids adopt a configuration substantially aligned with each other along a direction parallel the optical path OP. In alternative embodiments, the repelled first and third liquids may adopt configurations which are not aligned with each other in this way.

The third liquid 40 may include a colour filter, similarly as described for the first liquid 220. The third liquid 40 may be black, as described for the first liquid 220, to absorb substantially all radiation passing through the third liquid. By differently moving the first and third liquids 220, 40 across the corresponding hydrophobic layers 224, 44, the colour and/or brightness of radiation passing through the element 202 can be controlled. Non-fluid colour filters 234, 235 may optionally be included to allow further control over the colour of the radiation.

Figure 4:
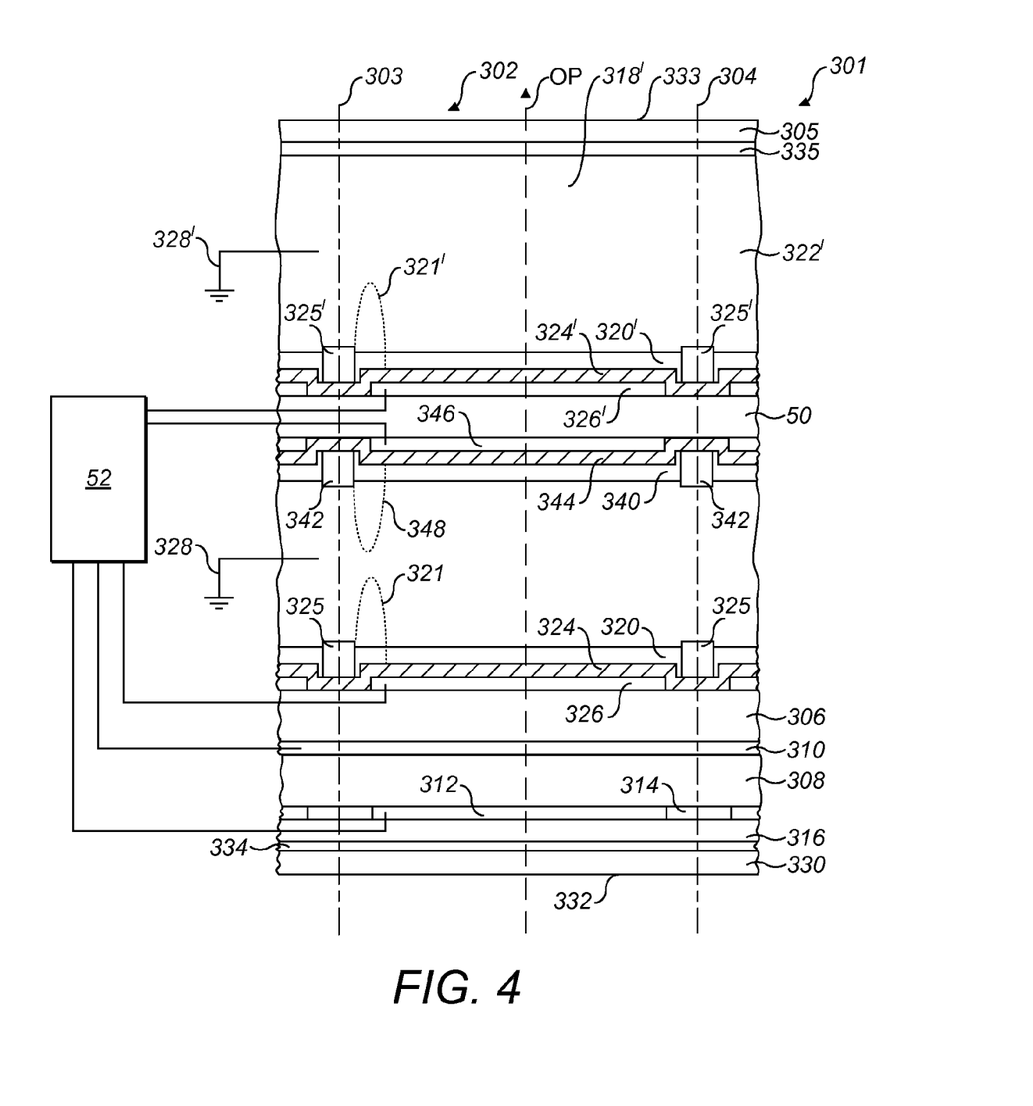

Referring now to FIG. 4, a three layer embodiment of the invention will be described. Features of this embodiment are similar to those described previously. Such features will be referred to using the same reference numerals, incremented by 300; corresponding descriptions should be taken to apply here also.

This embodiment is similar to that described using FIG. 3 except that, additionally, a radiation valve described using FIG. 1 is stacked upon an element described using FIG. 3. Features corresponding with the third layer correspond with similar features of the first layer; the appropriate reference numerals will therefore be used herein, incremented by ', for example 20 would be 20'.

The second support plate adjacent the third layer which is stacked on the first support plate adjacent the second layer are in this embodiment integrated as one common support plate 50. Alternatively, two separate support plates may be provided, similar to the first and second support plates described previously; this makes manufacture of the display 301 simple, by stacking a pre-manufactured one layer radiation valve on a pre-manufactured two layer radiation valve. Further, the second support plate 306 may be a common support plate for the radiation valve and the switchable part. Also, the third layer of this element may be situated adjacent the first support plate 305 instead of adjacent the common support plate 50, meaning that it is not necessary to process one side of the common support plate 50. Thus, the common support plate may be of a thinner construction, which provides for reduced parallax.

The control system 52 is similar to that of the embodiment described using FIG. 3, but is also electrically connected to the first electrowetting electrode 326' corresponding with the third layer. Using the control system, by applying an appropriate voltage across the non-conductive liquid 320' of the third layer, this liquid 320' is moveable across the hydrophobic layer 324' of the third layer in a similar manner as switching the first liquid 320.

The non-conductive liquid 320' of the third layer may be coloured or may be black, as described previously. Thus, by differently moving the non-conductive liquids 320, 340, 320' of the first, second and third layers across the corresponding hydrophobic layers 324, 344, 324', the radiation colour and/or brightness can be controlled. Non-fluid colour filters 334, 335 may also be included, to allow further colour control.

Figure 5:
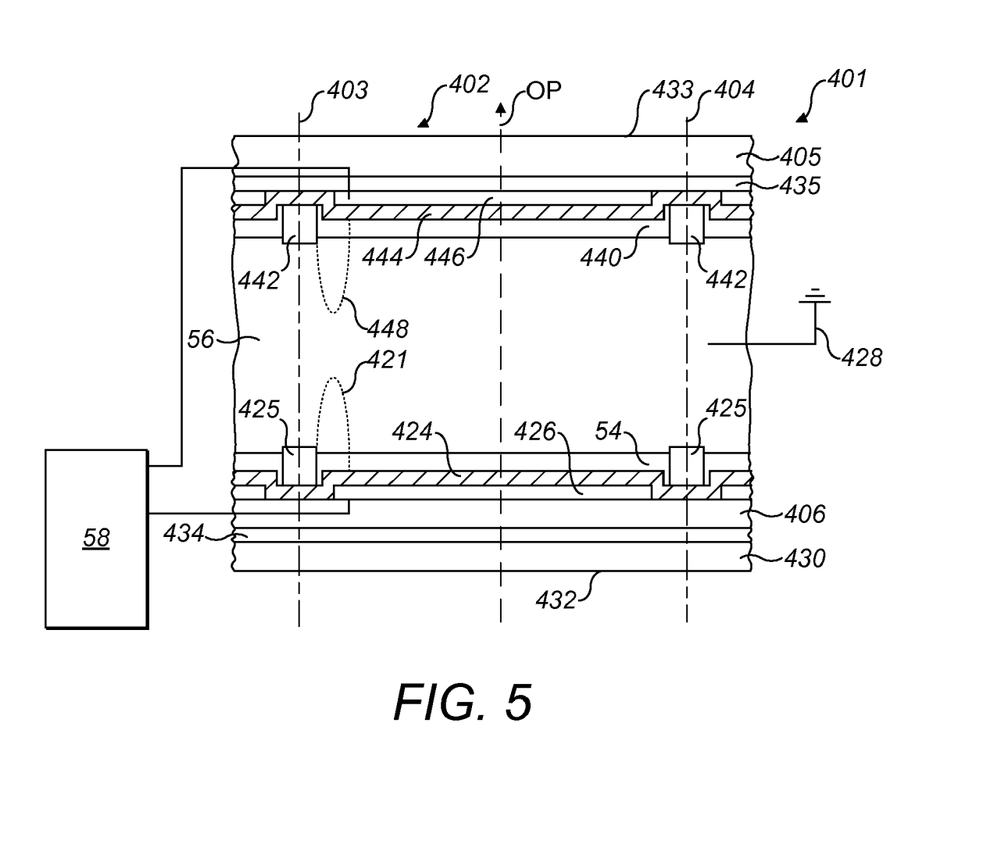

FIG. 5 shows schematically a further two layer embodiment of the invention. Features of this embodiment are similar to those described previously. Such features will be referred to using the same reference numerals, incremented by 400; corresponding descriptions should be taken to apply here also.

This embodiment is similar to the element described using FIG. 3 except that there is no switchable part which utilises a PDLC layer. Instead, to provide the functionality of the switchable part the first liquid is a reflective liquid 54, preferably diffusively reflective, and the second liquid is a non-reflective liquid 56. The reflective properties of the reflective liquid 54 may be provided by white particles, for example of titanium dioxide ($TiO_2$), BiPHoR™ or Latex suspended in the first liquid. The control system is similar to that described using FIG. 3, but is only electrically connected to the first and third electrowetting electrodes 226, 446 because there is no PDLC type switchable part in this embodiment; instead the functionality of the switchable part is provided by the reflective liquid 54. With a zero voltage applied across the reflective liquid 54, the reflective liquid 54 substantially covers the hydrophobic layer 424 and provides the reflective mode of the switchable part. By applying a nonzero voltage across the reflective liquid 54, to switch the reflective liquid 54 to adopt the configuration indicated by dashed line 421, the transmissive mode is provided. Transflective modes may also be obtained which exhibit both reflective and transmissive characteristics, by applying an appropriate voltage so that the reflective liquid 54 partially covers the hydrophobic layer 424.

The element 402 comprises at least one non-fluid colour filter 434, 435 to filter radiation emitted by the backlight 430. To filter ambient radiation, at least one such non-fluid filter is positioned between the viewing side 433 and the reflective liquid 54. Preferably, another non-fluid colour filter, providing colour filtering of the same wavelength(s) as that for the ambient radiation, is positioned between the backlight 430 and the reflective liquid 54. Thus, colour saturation of radiation exiting the element through the viewing side 433 is substantially the same for both transmissive and reflective modes.

It is envisaged that the switchable part of this embodiment, utilising the reflective liquid 54, may also be provided in two layer and three layer electrowetting elements, in accordance with the present invention.

Figure 6:
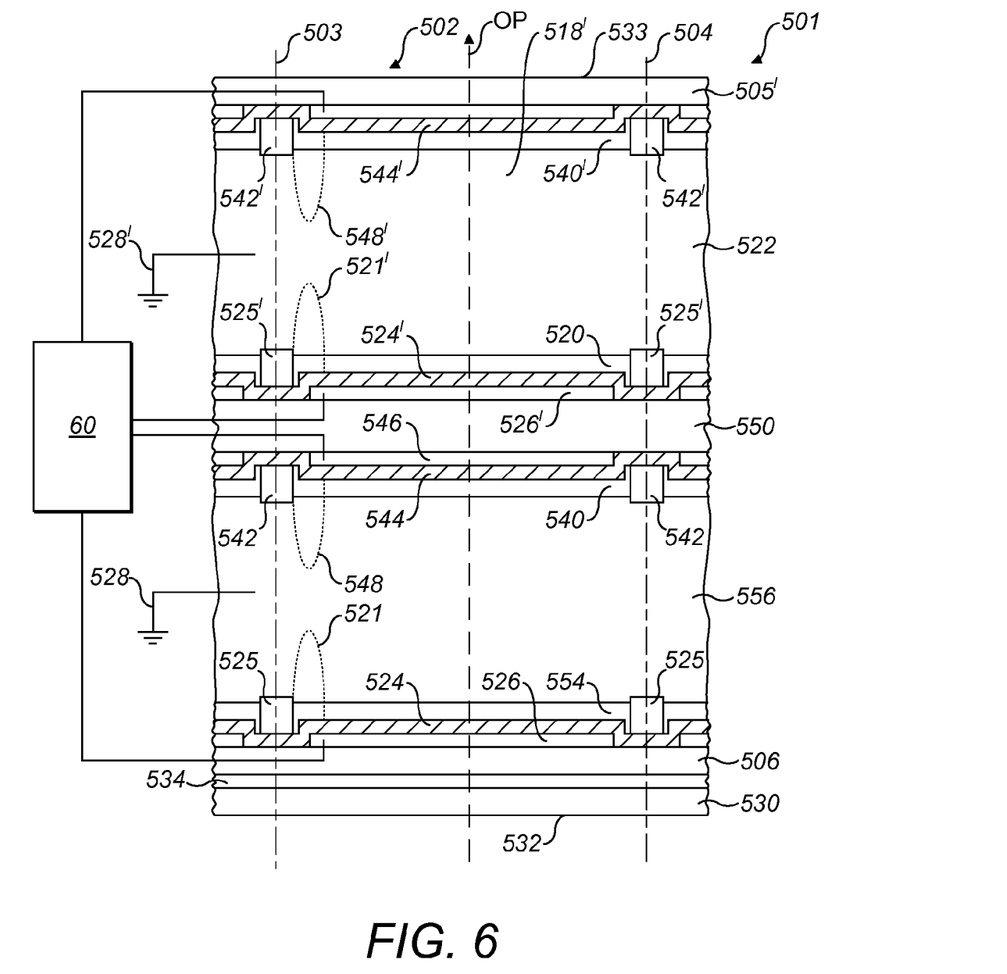

FIG. 6 illustrates schematically a four layer embodiment of the present invention. Features of this embodiment are similar to those described previously. Such features will be referred to using the same reference numerals, incremented by 500; corresponding descriptions should be taken to apply here also.

In this embodiment, two of the radiation valves described using FIG. 3 are stacked one on top of the other. However, the switchable part does not use a PDLC layer, but instead a reflective liquid 554, in accordance with that described using FIG. 5. The reflective liquid 554 corresponds with the first layer of the display 501. Features of the fourth layer which correspond with features of the second layer, and features of the third layer corresponding with those of the first layer, are referred to using reference numerals incremented with '.

The non-conductive liquids of the second, third and fourth layers include a colour filter for filtering radiation passing through the element 502. To ensure substantially matching colour saturation for both the transmissive and reflective modes, a non-fluid colour filter 534 may be positioned between the backlight 430 and the reflective liquid 554 to filter the same wavelength(s) of radiation as one of the fluid colour filters. Other non-fluid colour filters may be included in the display 501 to control the colour of radiation at the viewing side 533.

A control system 60 similar to that described using FIG. 4 is provided, except that it lacks any electrical connections for a PDLC type switchable part and includes an electrical connection to the electrowetting electrode corresponding to the fourth layer. By applying appropriate voltages to move, differently, the four layers of non-conductive fluids 554, 540, 520, 540', the element 501 is switchable to provide reflective, transmissive and transflective modes using the first layer, in combination with suitable liquid configurations for obtaining radiation with a desired colour at the viewing side 533, using the colour filter of the second, third and fourth layers. For example, where the second, third and fourth layer liquids are magenta, cyan and yellow colour filters, respectively, a full colour display 501 is realised.

It is envisaged that a common support plate 550 may be positioned between the second and third layers to support mechanically the third and fourth layers. However, alternatively, there may be two support plates instead of one common support plate. This allows simple manufacture of the display 501 by stacking two pre-manufactured two layer electrowetting elements.

The non-conductive liquids may be differently configured than described. For example, the reflective liquid may be provided in a different non-conductive liquid layer. Further, one of the coloured liquids may alternatively be black, to provide an optical shutter.

The display device of each embodiment includes a plurality of electrowetting elements of an embodiment described above, arranged for example in a matrix. The control system controls operation of each electrowetting element for switching to a reflective, transmissive or transflective mode and/or for switching to obtain a desired radiation characteristic, such as colour. Different elements may be switched in this way either all simultaneously or differently than for other elements. Thus, a desired image is provided by the plurality of electrowetting elements; each electrowetting element corresponding with a pixel of the display. Alternatively, a plurality of elements correspond with a pixel, where, for example, each element of the pixel provides different coloured radiation such as red, green and blue to form a RGB pixel. Further, the control system may switch the switchable part of each element in accordance with the lighting conditions of the viewing side of the display. Accordingly, an image formed by the plurality of electrowetting elements will be visible in any ambient light level, from bright sunlight to darkness.

The above embodiments are to be understood as illustrative examples of the invention. Further embodiments of the invention are envisaged. For example, different combinations of coloured fluids and non-fluid colour filters may be provided to obtain desired colours of radiation. A coloured PDLC layer may also function as one of these non-fluid colour filters. Further, the switchable part of the invention may be positioned differently in combination with the radiation valve to provide desired optical effects in the radiation. Two, three and four layer embodiments have been described which include at least one further fluid, for example the third liquid, in addition to the first and second liquids which are configurable to change a radiation characteristic. Elements including yet further fluid layers are also envisaged.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. An electrowetting element for a display device, wherein the electrowetting element comprises:
    a) a radiation valve comprising a first fluid and a second fluid immiscible with the first fluid, wherein the first and second fluids are configurable to change a characteristic of radiation passing through at least one of said first and second fluids; and
    b) an electrically switchable part switchable between a reflective mode for reflecting radiation incident on the switchable part and towards said radiation valve, and a transmissive mode for transmitting radiation incident on the switchable part through said switchable part and towards said radiation valve,
    wherein said switchable part includes a reflective fluid and a non-reflective fluid immiscible with the reflective fluid, the reflective and non-reflective fluids being configurable to switch said reflective and non-reflective fluids between the transmissive mode and the reflective mode.

2. An electrowetting element according to claim 1, including a support plate arranged between said switchable part and said radiation valve to support mechanically the switchable part and the radiation valve.

3. An electrowetting element according to claim 1, wherein the electrowetting element is arranged for a control system to apply a first voltage across at least one of said first and second fluids and to apply a second voltage to said switchable part.

4. An electrowetting element according to claim 1, wherein said switchable part is integrated with said radiation valve, said second fluid being said non-reflective fluid, wherein only said second fluid separates said first fluid and said reflective fluid.

5. An electrowetting element according to claim 1, wherein said switchable part includes a layer of polymer dispersed liquid crystal (PDLC) and is switchable between the transmissive and reflective modes by application of a voltage across said PDLC layer.

6. An electrowetting element according to claim 1, wherein said radiation valve includes at least one further fluid which is immiscible with at least one of said first and second fluids or with a second further fluid, said at least one further fluid being configurable between different fluid configurations to change said characteristic of the radiation.

7. An electrowetting element according to claim 1, wherein said electrowetting element comprises a first colour filter arranged to filter radiation passing through at least part of the electrowetting element.

8. An electrowetting element according to claim 7, wherein at least one of said first, second and at least one further fluid includes said first colour filter.

9. An electrowetting element according to claim 7, wherein said electrowetting element comprises a second colour filter, said first and second colour filters being arranged such that, with the switchable part being in the reflective mode, radiation passing through the electrowetting element passes at least twice through said first colour filter only, and, with the switchable part being in the transmissive mode, radiation passing through the electrowetting element passes at least once through each of said first and second colour filters.

10. An electrowetting element according to claim 1, wherein one of said fluids is arranged to absorb substantially all radiation passing through at least part of said electrowetting element.

11. An electrowetting element according to claim 1, wherein said switchable part is switchable to provide an intermediate mode for reflecting radiation incident on the switchable part towards said radiation valve and for transmitting radiation incident on the switchable part through said switchable part and towards said radiation valve.

12. An electrowetting element according to claim 1, wherein said electrowetting element comprises a radiation emitter arranged to emit radiation for transmission through said switchable part.

13. A display device comprising a plurality of the electrowetting element according to claim 1, and a control system arranged to control electrically each of said plurality of electrowetting elements.

14. A display device according to claim 13, wherein said control system is arranged to switch simultaneously the switchable part of each of said plurality of electrowetting elements between the reflective mode and the transmissive mode and/or to switch the fluids between different configurations.

15. A display device according to claim 14, wherein said control system is arranged to switch the switchable part of one of the plurality of electrowetting elements between the reflective mode and the transmissive mode, and/or to configure the first and second fluids, separately from a different one of the plurality of electrowetting elements.

16. A display device according to claim 13, wherein said control system is arranged to apply a first voltage across at least one of said first and second fluids of the radiation valve of at least one electrowetting element and to apply a second voltage to said switchable part of at least one electrowetting element.

17. A display device according to claim 16, wherein the control system is arranged to apply said first and second voltages in accordance with a maximum voltage set to provide said switching of the switchable part independently of said configuring of the first and second fluids.

18. A display device according to claim 16, wherein the control system is arranged to apply said first and second voltages in accordance with a voltage timing pattern determined to provide said switching of the switchable part independently of said configuring of the first and second fluids.

19. A display device according to claim 16, wherein said switchable part is electrically isolated from said radiation valve, and said control system is arranged to apply said first and second voltages in accordance with an extent of said electrical isolation.

20. A display device according to claim 13, wherein said display device includes an ambient radiation detector and the control system is arranged to switch the switchable part in accordance with an output signal of the ambient radiation detector.

21. A control system arranged to control at least one electrowetting element in accordance with claim 1, wherein said control system is arranged to apply a first voltage across at least one of said first and second fluids of the radiation valve of the at least one electrowetting element and to apply a second voltage to said switchable part of the at least one electrowetting element.

22. A control system according to claim 21, wherein the control system is arranged to apply said first and second voltages in accordance with a maximum voltage set to provide said switching of the switchable part independently of said configuring of the first and second fluids.

23. A control system according to claim 21, wherein the control system is arranged to apply said first and second voltages in accordance with a voltage timing pattern determined to provide said switching of the switchable part independently of said configuring of the first and second fluids.

24. A control system according to claim 21, wherein said switchable part is electrically isolated from said radiation valve, and said control system is arranged to apply said first and second voltages in accordance with an extent of said electrical isolation.

* * * * *